INVENTORS
EVERT V. BLOOMQUIST
GERALD E. BLOOMQUIST
BY
ATTORNEYS

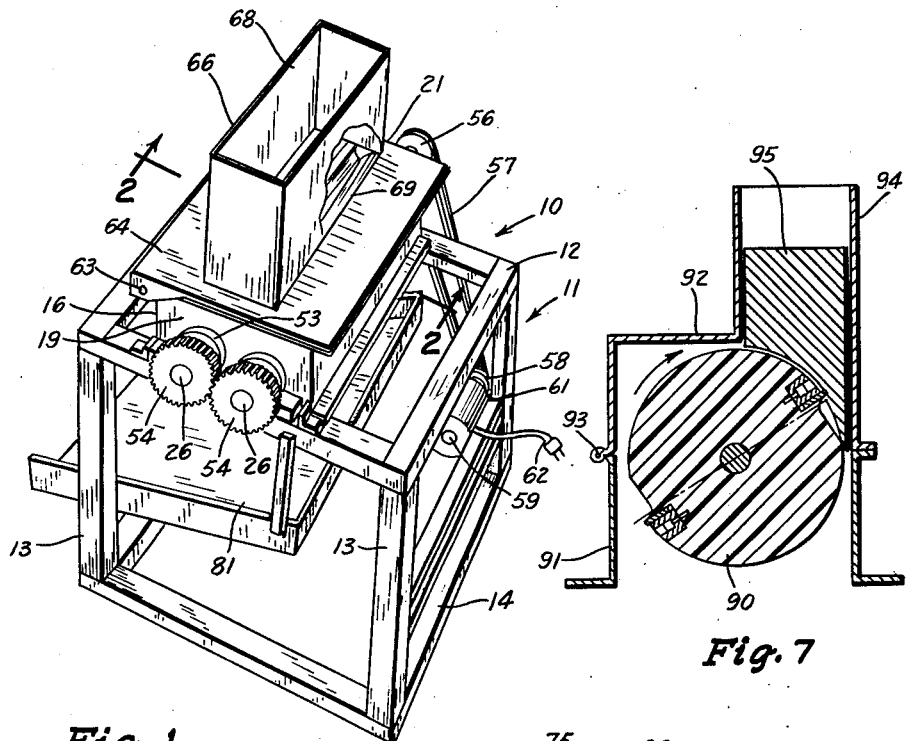
Fig. 1
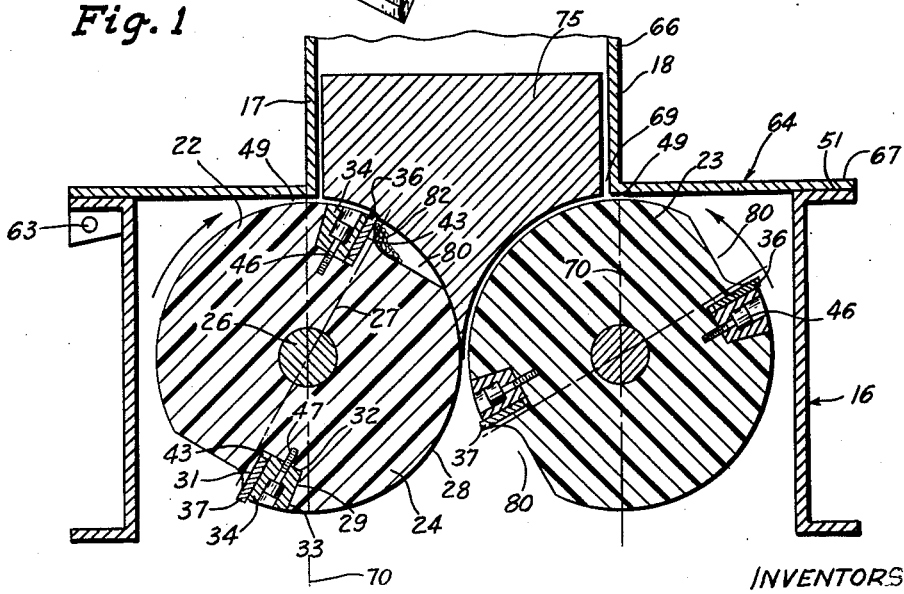
Fig. 2
Fig. 7
INVENTORS
EVERT V. BLOOMQUIST
GERALD E. BLOOMQUIST
BY Lowell & Henderson
ATTORNEYS June 5, 1962  E. V. BLOOMQUIST ET AL  3,037,540
MACHINE FOR PULVERIZING FROZEN FOOD
Filed March 7, 1960  2 Sheets-Sheet 2

United States Patent Office 3,037,540
Patented June 5, 1962

3,037,540
MACHINE FOR PULVERIZING FROZEN FOOD
Evert V. Bloomquist and Gerald E. Bloomquist, both of P.O. Box 807, Wausau, Wis.
Filed Mar. 7, 1960, Ser. No. 13,126
2 Claims. (Cl. 146—123)

This invention relates generally to a machine for pulverizing ice or frozen foods and in particular to a machine for pulverizing frozen food used in the feeding of animals on mink or fox ranches, or for pulverizing ice to form snow.

Frozen food used on mink and fox ranches is usually in a block form and, whether ground or unground, consists generally of frozen whole fish, tripe, chicken heads and feet and meat and bone. At the present time considerable difficulty and annoyance is encountered by the rancher due to the fact that meat grinders heretofore available have been adapted to handle only unfrozen or thawed food. This necessitated, in the use of unground food, of taking a frozen food block, permitting it to thaw, and then cutting the thawed food before it could be handled by the meat grinder. This difficulty is completely eliminated by the machine of the present invention so that frozen food blocks can be taken directly from the freezer and pulverized. Most frozen pre-ground foods are rather coarse, and when pulverized are cut to the same fineness to aid in the uniform mixing of such food with other foods. The pulverizing action of the machine of this invention is of such uniformity that the machine can also be used in the making of snow from ice for ski events and the like, when natural snow is lacking or in regions where snow does not occur.

It is an object of this invention, therefore, to provide an improved machine for pulverizing a frozen material in block form such as frozen food or ice.

Another object of this invention is to provide a pulverizing machine for frozen food blocks wherein the blocks are self-fed into the machine by the action of the cutter heads.

A further object of this invention is to provide a pulverizing machine for ice or frozen food blocks wherein the cutter heads, in advance of a pair of cutters thereon, are formed with cutting-receiving cavities, and the cutters are set out different distances from the cutter head to assure uniformity in the size of the cuttings to prevent chattering or bouncing of the blocks on the cutter heads.

Still another object of this invention is to provide a frozen food pulverizing machine which is of a compact and simple construction, efficient in operation and adapted to be readily transportable from place to place for use.

Further objects, features and advantages of this invention will become apparent from the following description when taken in connection with the accompanying drawing wherein:

FIG. 1 is a perspective view of the pulverizing machine of this invention with parts broken away to more clearly show its construction;

FIG. 2 is an enlarged sectional view taken substantially along the line 2—2 in FIG. 1 showing the assembly relation of the cutter heads and material hopper, and the action of the cutter heads on a frozen block of material in the hopper;

FIG. 7 is a modified form of the invention showing a machine with a single cutter head.

Figure 3:
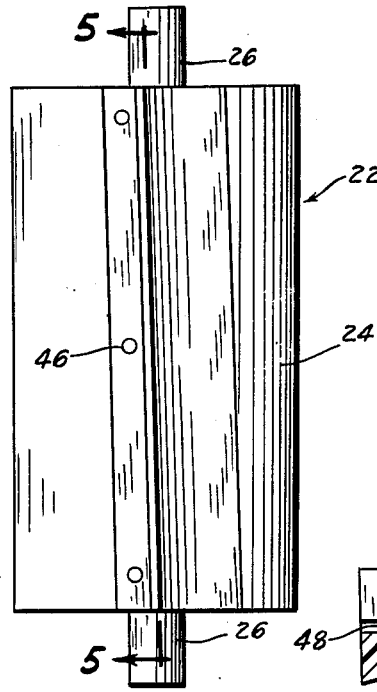
FIG. 3 is a side elevational view of a cutter head.

With reference to the drawings the pulverizing machine of this invention, indicated generally as 10 in FIG. 1, is shown as mounted upon a frame unit 11 having an open top frame structure 12 of a generally rectangular shape supported on legs 13 which are secured to a base 14.

The machine 10 includes a housing or casing 16 of an open rectangular shape having side walls 17 and 18 and end walls 19 and 21 (FIGS. 1 and 2). Positioned within and extended longitudinally of the housing 16 is a pair of cutter heads 22 and 23. Since each cutter head 22 and 23 is similar in construction and operation only the cutter head 22 will be described in detail, with like numbers being applied to like parts in each cutter head.

Figure 4:
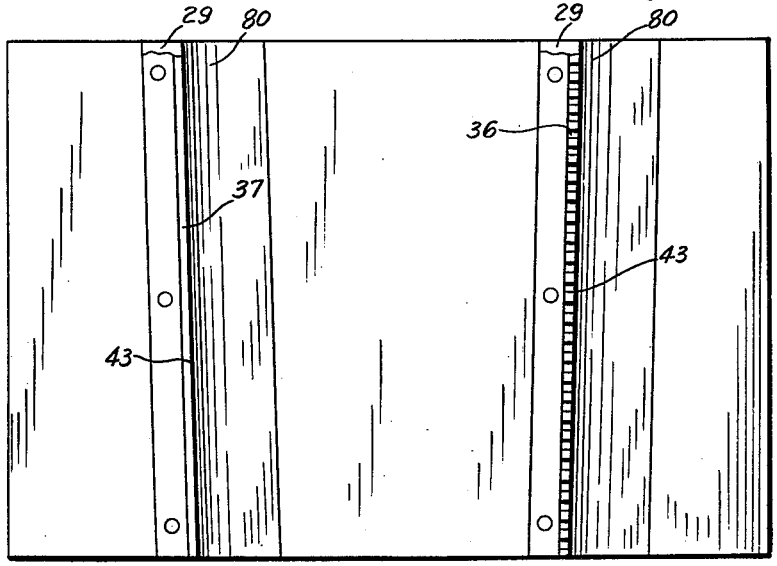
FIG. 4 is a developed view of a cutter head shown in FIG. 3, with portions broken away for clarity.

The cutter head 22 (FIG. 2) is comprised of a cylindrical body member 24 mounted on an arbor or shaft 26 which, as best appears in FIG. 3, projects outwardly from opposite ends of the body member 24. To opposite sides of a common diameter, indicated as 27 in FIG. 2, and in diametric opposition, the peripheral surface 28 of the cylindrical body member 24 is formed with a longitudinally extended recess or groove 29 having a side wall 31 adjacent and parallel to the plane of the diameter 27, a bottom wall 32 extended normal to the side wall 31, and a side wall 33 which is inclined at a slight angle in a direction outwardly from the bottom wall 32. As best appears in FIG. 4, the grooves 29 are reversely inclined longitudinally of the cylindrical body member 24, for a purpose to appear later, with this inclination, in one form of the invention, being on the order of about one-quarter of an inch relative to a longitudinal plane extended through the axis of the body member 24.

Figure 6:
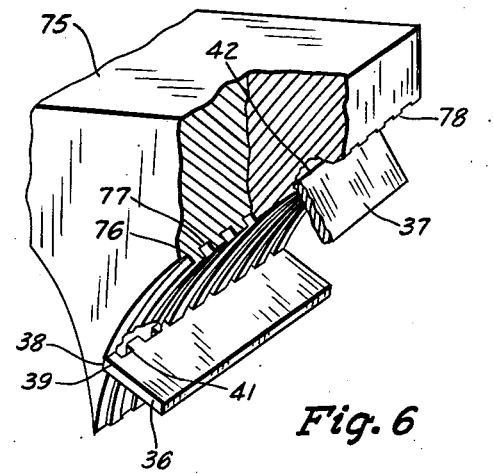
FIG. 6 is a diagrammatic perspective view showing the complementary cutting action of the knives in a cutter head on a piece of frozen material being pulverized.

Receivable within each groove 29 is a corresponding wedge member 34 and cutting knife 36 and 37. The cutting knife 36, as shown in FIG. 6, has a cutting edge 38 formed with alternate cutting teeth 39 and notches 41 so as to be of a serrated form over its full length. The cutting knife 37, is similar in all respects to the cutting knife 36, except that its cutting edge 42 is continuous or straight over the full length thereof.

With a knife 36 and 37 positioned in a corresponding groove 29 (FIG. 2) with its leading side 43 positioned against a corresponding side wall 31, a wedge member 34 is positioned within a groove 29 between the trailing side of a knife 36 and 37, and the inclined side wall 33. On the tightening of inset screws 46, insertable through a wedge member 34 and threadably engageable in associated tapped holes 47 formed in the body member 24, the knives 36 and 37 are securely held within the body member 24 by the wedging action of a wedge member 34 with an inclined side wall 33 of a groove 29.

Figure 5:
FIG. 5 is a fragmentary sectional detail view as seen along the line 5—5 in FIG. 3.

In this assembly of a cutting knife 36 and 37 with the cylindrical body member 24 the adjustment of a knife, such that its cutting edge is set a predetermined distance outwardly from the peripheral surface 28 of the body member 24, is obtained by the provision of knife adjusting screws 48 (FIG. 5) threadable within tapped holes formed in the base 32 of a groove 29 at a position immediately below a knife 36 and 37. The screws 48 are arranged at opposite ends of a groove 29 and by their relative adjustment a knife 36 and 37 can be adjusted so that its cutting edge is parallel with the axis of the body member 24 at a set distance outwardly from the peripheral surface of the body member.

In one embodiment of the invention the serrated knife 36 has its cutting edge 38 set out one-eighth of an inch from the periphery of the body member 24, and at this setting the cutting edge 42 of the straight knife 37 is set out three thirty-seconds of an inch from the periphery of the body member 24. It is seen, therefore, that the straight edge 42 of the knife 37 is set out from the periphery of the rotary head a lesser distance than the cutting edge 38 of the knife 36.

With reference to FIG. 2 it is seen that the cutter heads 22 and 23 are arranged in a side by side relation with the knives on one cutter head in a clearance relation with the knives on the other cutter head, and with their top peripheral surface portions, indicated at 49, being substantially at the level of the top surface 51 of the housing 16. The shafts 26 are supported in bearings 53 (FIG. 1) mounted in the housing side walls 19. As illustrated, the cutter head 23 operates as a drive for the cutter head 22 and for this purpose meshing gears 54 are carried at one of the corresponding projected ends of the shafts 26. The other projected end of the shaft 26 for the cutter head 23 carries a belt pulley 56 which is driven by a belt 57 from a pulley 58 mounted on the shaft 59 of a drive motor 61 which is suitably mounted on the frame 11. The motor 61 is of electrical type and has a usual plug-in 62 for connection with a source of electrical supply.

Pivotally supported at 63 (FIGS. 1 and 2) is a material hopper assembly 64, for pivotal swinging movement to an open position located to one side of the housing 16, and to a closed position covering the open top of the housing 16, and in resting engagement on the top surface 51 of the housing. The hopper assembly 64 may be securely locked in its closed position by the provision of any suitable locking means (not shown) adapted to secure the free end 67 of the hopper assembly 64 with the housing 16.

The hopper assembly 64 includes a material receiving hopper or chute 66 having an open top 68 and bottom 69 (FIGS. 1 and 2) and of a rectangular shape in transverse cross section. This shape is such as to define an area or cutting zone, relative to the cutter heads 22 and 23, which is coextensive with the length of the cutter heads and of a width defined substantially by vertical planes, indicated in FIG. 2 at 70, projected through the axes of the cutter head shafts 26.

In operation the cutter heads 22 and 23 are rotated in a direction such that their upper adjacent quarter segmental portions move inwardly and downwardly toward each other as indicated by the arrows in FIG. 2. With a block of frozen material 75 positioned within the hopper 66, it is moved by gravity into engagement with the cutter heads 22 and 23. By virtue of the reversely inclined relation of a pair of knives 36 and 37 on a cutter head 22 and 23, the block 75 is continuously self-fed in a direction downwardly against the cutter heads 22 and 23. As a result of the coaction of the knives 36 and 37, and the setting of the cutting edge 42 of the knife 37 at a lesser distance outwardly from the periphery of a cutter head than the serrated cutting edge of a knife 36, the material 75 is cut so as to form alternate projections 76 and notches 77 (FIG. 6). The following travel of the straight knife 37 acts only upon the projections 76, but by virtue of being set out from the periphery of a cutter head at a lesser distance than the serrated knife 36, a portion of the projections 76 remain as indicated at 78.

As a result, on the next pass of a serrated knife 36 over the block 75, there is removed from the grooves 77 an amount of material equal in kind and amount to that removed from the projections 76 by the straight knife 37. Thus, after the initial cut by a serrated knife 36, both of the knives 36 and 37 function to remove like amounts and kind of the material 75 whereby the removed material is of the same uniformity as to fineness.

In order to assure this uniformity of cutting and to maintain the material 75 in continuous engagement with the cutter heads 22 and 23, each body member 24, at a position adjacent the leading side 43 of a knife 36 and 37, is formed with a cutting-receiving cavity or recess 80 (FIG. 4) that extends longitudinally over the full length of a body member 24 in a parallel relation with a corresponding knife, namely, in a parallel relation with a corresponding groove 29. Thus as is best illustrated in FIG. 2, the cuttings 82 removed from the material 75 by the knife 36 for the cutter head 22, are received or collected in the cavity 80 for discharge from the machine into a receiving pan 81 (FIG. 1) when a cavity 80 is in a position shown for the knife 37 of the cutter head 23. The cuttings 82 are thus prevented from collecting ahead of the leading side 43 of a knife 36 and 37 and in turn are prevented from gathering between a knife and the surface of the block 75 being cut, whereby the block 75 is maintained against chattering or bouncing toward and away from the cutter heads 22 and 23.

As previously mentioned, the relative reversed inclination of a pair of knives 36 and 37 on a cutter head 22 and 23 provides for the material 75 being continuously self-fed against the cutter heads. This feeding action is complemented by the arrangement of the hopper 66 relative to the cutter heads 22 and 23 which provides for the cutting action of the knives 36 and 37 always being in a direction inwardly and downwardly on the surface of the block 75 being cut. In other words, at no time are the knives 36 and 37 doing any cutting when moving in an upward direction toward the material 75.

The modified form of the invention shown in FIG. 7 is the same in all respects to the form of FIG. 1 except for the provision of a single cutter head 90 which is similar in all respects to a cutter head 22 and 23. The cutter head 90 is rotatably mounted in a housing 91 having a hopper structure 92 pivoted thereon, as indicated at 93, for swingable movement into and out of a housing covering relation. The hopper 94 is of a rectangular shape in transverse section and, when in its closed position is adapted to feed material 95 downwardly onto the cutter head 90 over an area or cutting zone extended longitudinally over the full length of the cutter head and of a width equal substantially to the radius of the cutter head. In other words, only an upward quarter segment of the cutter head 90 is exposed through the hopper 94, and the cutter head 90 is rotated in the direction indicated by the arrow so as to move the cutters 36 and 37 inwardly and downwardly of the material 95 being cut or pulverized.

Although the invention has been described with respect to a preferred embodiment thereof it is to be understood that it is not to be so limited since changes and modifications can be made therein which are within the full intended scope of this invention as defined by the appended claims.

We claim:

1. A machine for pulverizing frozen food material including a frame, a cutter head rotatably supported on said frame, a pair of knives having longitudinally extending cutting edges, said knives being arranged opposite each other on said cutter head in planes extended substantially radially of said cutter head, said cutter head being formed with a pair of axially extended cavities corresponding to said knives, one in front of each of said knives, said cavities being of relatively short circumferential extent whereby the cutter head is of the same radius over the peripheral portions thereof between said cavities, and hopper means on said frame for directing the frozen material to be pulverized downwardly onto said cutter head into a cutting zone extended between a substantially vertical plane passing through the longitudinal axis of the cutter head and a substantially horizontal plane passing through the longitudinal axis of said cutter head, the circumferential extent of said zone being less than the circumferential distance between said knives, whereby said knives are engageable one at a time with the frozen material, with each cavity being of a size such that the material cut by a knife, during a single cutting engagement thereof with the frozen material, is received in a corresponding cavity for discharge from the cavity following said engagement.

2. The invention according to claim 1 wherein one of said knives has a continuous cutting edge and the other of said knives a notched cutting edge.

References Cited in the file of this patent

UNITED STATES PATENTS

| | | |
|---|---|---|
| 625,215 | Tice | May 16, 1899 |
| 1,239,926 | Luer | Sept. 11, 1917 |
| 1,675,901 | Mitts et al. | July 3, 1928 |
| 1,705,994 | Peterson | Mar. 19, 1929 |
| 1,741,053 | Goldstein | Dec. 24, 1929 |
| 2,261,090 | Lind | Oct. 28, 1941 |
| 2,449,605 | Kelton | Sept. 21, 1948 |
| 2,490,564 | Vincent | Dec. 6, 1949 |
| 2,614,597 | Magnus | Oct. 21, 1952 |